US005490768A

United States Patent [19]
Veronesi et al.

[11] Patent Number: 5,490,768
[45] Date of Patent: Feb. 13, 1996

[54] WATER JET PROPULSOR POWERED BY AN INTEGRAL CANNED ELECTRIC MOTOR

[75] Inventors: Luciano Veronesi; James A. Drake, both of O'Hara Township, Allegheny County, Pa.

[73] Assignee: Westinghouse Electric Corporation, Pittsburgh, Pa.

[21] Appl. No.: 164,892

[22] Filed: Dec. 9, 1993

[51] Int. Cl.[6] .................... F04B 35/04
[52] U.S. Cl. .............. 417/356; 417/366; 417/423.12; 440/38
[58] Field of Search .................. 417/356, 357, 417/366, 358, 423.8, 423.12; 440/38

[56] References Cited

U.S. PATENT DOCUMENTS

| | | | |
|---|---|---|---|
| 2,312,848 | 3/1943 | Pezzillo | 417/356 |
| 2,537,310 | 1/1951 | Lapp | 417/356 |
| 3,723,028 | 3/1973 | Bottoms et al. | 417/356 |
| 4,050,849 | 9/1977 | Sheets . | |
| 4,341,173 | 7/1982 | Hagelberg et al. . | |
| 4,474,561 | 10/1984 | Haglund . | |
| 4,643,685 | 2/1987 | Nishida . | |
| 4,718,870 | 1/1988 | Watts . | |
| 4,917,637 | 4/1990 | Soga et al. . | |
| 5,101,128 | 3/1992 | Veronesi et al. . | |

FOREIGN PATENT DOCUMENTS 0006892  1/1987  Japan .......................... 440/38

Primary Examiner—Charles Freay

[57] ABSTRACT

A water jet propulsor powered by an integral canned electric motor includes a hollow housing having a hermetically sealed stator mounted therein. The stator is electrically connected to a source of electrical energy in the vessel. An impeller assembly that includes a tubular suction shroud and impeller is rotatably mounted inside the housing. The impeller assembly includes a hermetically sealed rotor which is mounted around the suction shroud and positioned inside the stator in operative association therewith. Energizing the stator rotates the rotor, which in turn rotates the impeller to pump water from the intake end of the housing to the outlet end of the housing and adds velocity and head to the water to be discharged from the outlet end. The discharged water creates thrust which propels the vessel.

29 Claims, 5 Drawing Sheets

WATER JET PROPULSOR POWERED BY AN INTEGRAL CANNED ELECTRIC MOTOR

BACKGROUND OF THE INVENTION

1. Field of the Invention

This invention relates to a water jet propulsor for a marine vessel and, more particularly, to a water jet propulsor powered an integral canned electric motor.

2. Description of the Prior Art

Water jet propulsors are often used as the main drives for high cruising speed leisure, commercial and naval marine vessels. The basic operating principal of water jet propulsion is similar to that of a screw-type propeller system. The propelling force is generated by adding momentum to the water by accelerating a certain flow of water in an astern direction. Water from under the vessel is fed through an inlet duct to an onboard pump which adds head to the water. This head is then applied to increase the velocity when the water passes through an outlet nozzle into the ambient atmospheric pressure. Steering and reversing forces are generating by deflecting the discharged flow using a flow deflection bucket which is typically hydraulically operated. The water jet system is typically located in the stern of the vessel and is positioned at an elevation which enables it to be self priming when activated and which maximizes propulsion efficiency.

Benefits of water jet propulsion include reduced noise, improved maneuverability, protected propulsion installation and shallow draft. The fuel efficiency of water jet propulsors is often better than with traditional sub-cavitating propellers at speeds above 20 to 25 knots, depending on the type of vessel.

FIG. 1 schematically illustrates a typical water jet installation of the prior art. The prior art water jet propulsion systems require a power source, such as a diesel engine, steam turbine or gas turbine, P to be located near the water jet impeller I. In addition, the power source P must be mechanically coupled to the impeller I by a drive shaft D through gear box and clutch T. Drive shaft D must be located within water flow conduit C, thereby interfering with the flow of water. In addition, seals are required around drive shaft D where it passes through the wall of water flow conduit C. This arrangement limits the flexibility for designing the vessel within which such a system is utilized. With this type of arrangement, most of the propulsion weight must be located in the stem of the vessel and the location of the pump center line is dictated by the size of the propulsion components.

There remains a need for a water jet propulsor that does not require a drive shaft to be located in the water flow conduit and which does not require the seals associated with a drive shaft passing through the walls of the water flow conduit. There also remains a need for a water jet propulsor which can be set at an elevation below the vessel static water line that is most convenient for self priming and propulsion efficiency and which does not require an engine or turbine to be located in close proximity thereto. The water jet propulsor of this invention has met these needs.

SUMMARY OF THE INVENTION

This invention provides an improved water jet propulsor for a marine vessel utilizing canned electric motor technology. The water jet propulsor includes a generally hollow housing secured to the hull of a marine vessel. The housing includes an inlet end and an outlet end. An annular stator is mounted inside the housing. Energizing means are provided for supplying electrical power to the stator. An impeller assembly is rotatably mounted in the hollow portion of the housing. The impeller assembly includes a tubular suction shroud extending through and rotatable relative to the annular stator. An impeller is secured to the tubular suction shroud. An annular rotor is mounted around the suction shroud and positioned inside the annular stator to form an electric motor. When the stator is energized, the rotor rotates, thereby rotating the tubular suction shroud and impeller to create a pressurized flow of water through the housing from the inlet end to the outlet end.

The tubular suction shroud preferably has a forward end and an aft end. The forward end is positioned to form a forward gap relative to the housing and the aft end is positioned to form an aft gap relative to the housing. The forward gap and the aft gap are in communication with one another forming a water circulation channel between the rotor and the housing. The forward gap is preferably on the inlet side of the impeller and the aft gap is preferably on the outlet side of the impeller. When the impeller is rotating, water pressure will be higher at the outlet end than at the inlet end of the housing. Water will flow from the higher pressure area at the aft gap to the lower pressure area at the forward gap to cool the motor.

At least one water cooled, hard surface bearing is preferably mounted on the housing and the impeller assembly and is positioned in the water circulation channel to rotatably support the impeller assembly.

In another embodiment of this invention, the water jet propulsor is provided with a hub centrally mounted inside of and secured to the housing. The hub is positioned either upstream or downstream from the impeller, relative to the direction of water flow, such that water passing from the inlet end to the outlet end of the housing must pass by the hub. The hub may rotatably support a portion of the impeller assembly. The hub may be secured to the housing by one or more flow straightening vanes, pre-swirl vanes or struts.

In one embodiment of the invention, electrical power is supplied to the rotor to form a synchronous motor. A smaller induction exciter/generator mounted on another portion of the impeller assembly functions as an exciter to supply power to the rotor. The rotor of the exciter/generator is electrically connected to the rotor of the motor.

The impeller assembly preferably includes a generally hollow shaft rotatably mounted in the hub. The shaft has an opening into the hollow portion on the intake side of the impeller. A second aft end of the suction shroud forms a hub gap relative to the hub and on the outlet side of the impeller. The hub gap and the opening in the shaft are preferably in communication with one another to form a second water circulation channel between the hub and the tubular suction shroud. Water cooled, hard surface radial bearings are mounted on the hub and tubular suction shroud and positioned in the second water circulation channel. The bearings rotatably support the tubular suction shroud. Hard surface, water cooled thrust bearings may be mounted on the impeller assembly and one of the hub or the housing. A separate water circulation pump may be provided to supply cooling and lubricating water to the bearings.

The impeller of this invention may be provided with at least one axial stage and at least one centrifugal stage. Alternatively, the impeller may have only one axial stage or at least one centrifugal stage. The outlet end of the water jet propulsor of this invention may be connected to a straight discharge conduit or to a volute. The outlet end may be also be provided with a flow deflector bucket for selectively deflecting the discharged water flow to steer the vessel. The inlet end of the housing is connected to an inlet conduit for supplying water to the propulsor.

The housing of the water jet propulsor of this invention may also include a water cooling jacket around the stator. The water jacket is preferably in communication with the water flowing through the housing such that water will flow through the cooling jacket to cool the stator during operation. Alternatively, a separate source of clean cooling water may be provided for circulation through the cooling jacket.

This invention will be more fully understood from the following detailed description of preferred embodiments on reference to the appended drawings.

DESCRIPTION OF PREFERRED EMBODIMENTS

Figure 1:
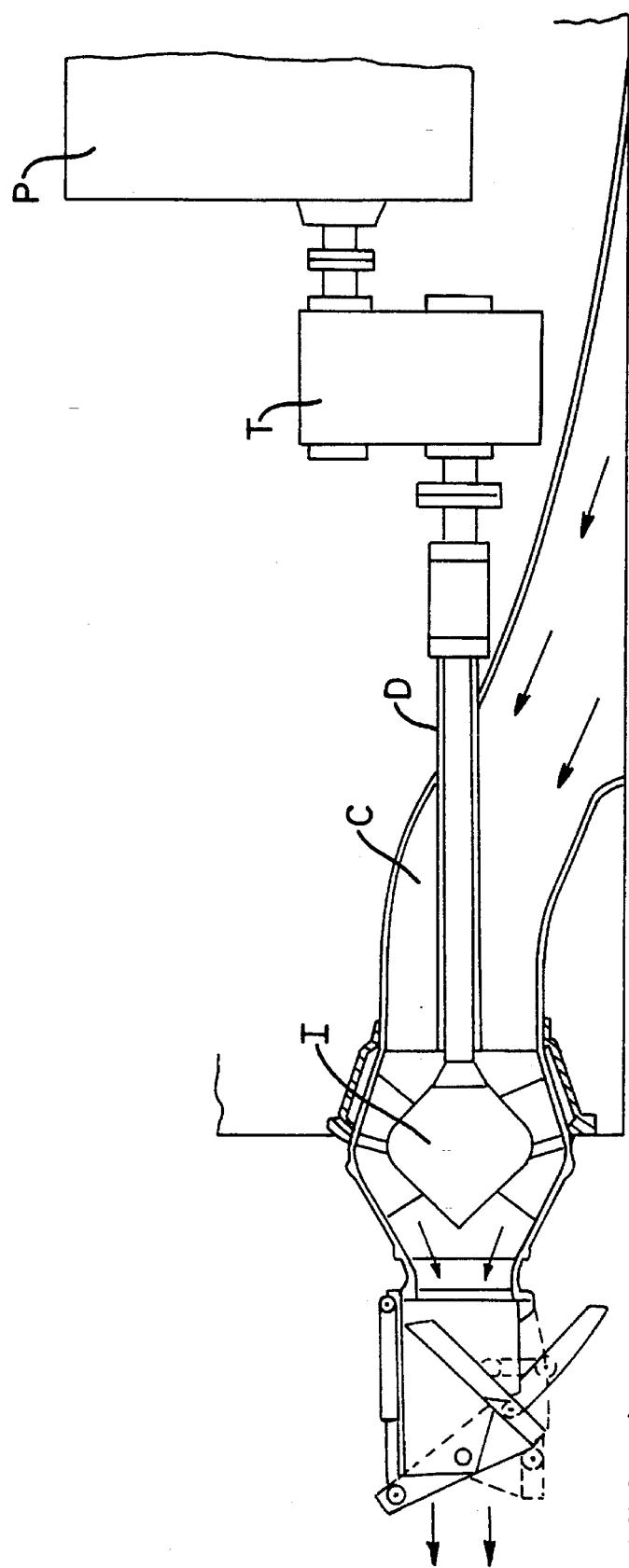
FIG. 1 is a schematic view of a water jet propulsor system of the prior art.
Figure 2:
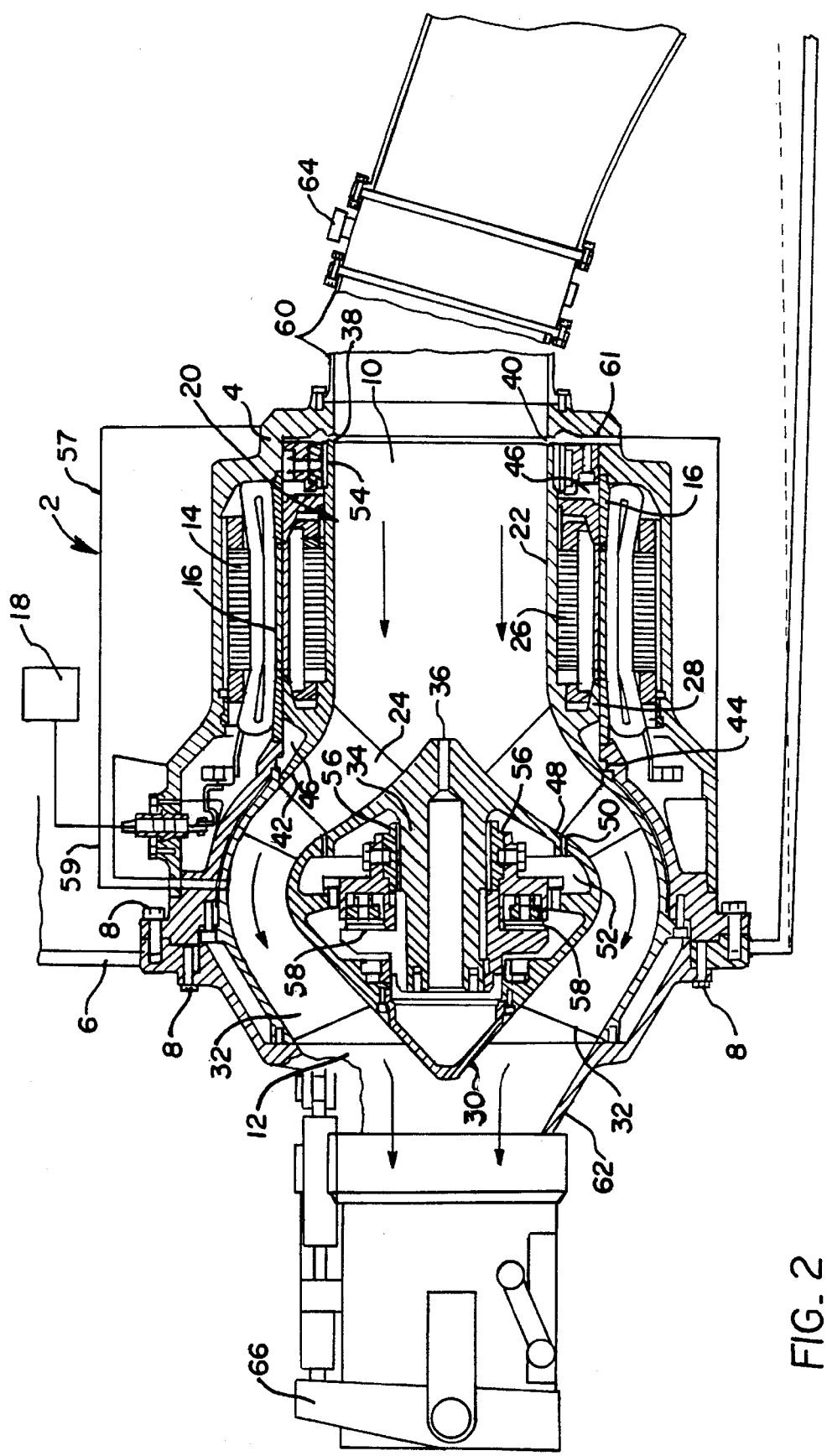
FIG. 2 is a longitudinal sectional view of one embodiment of the water jet propulsor of this invention.
Figure 3:
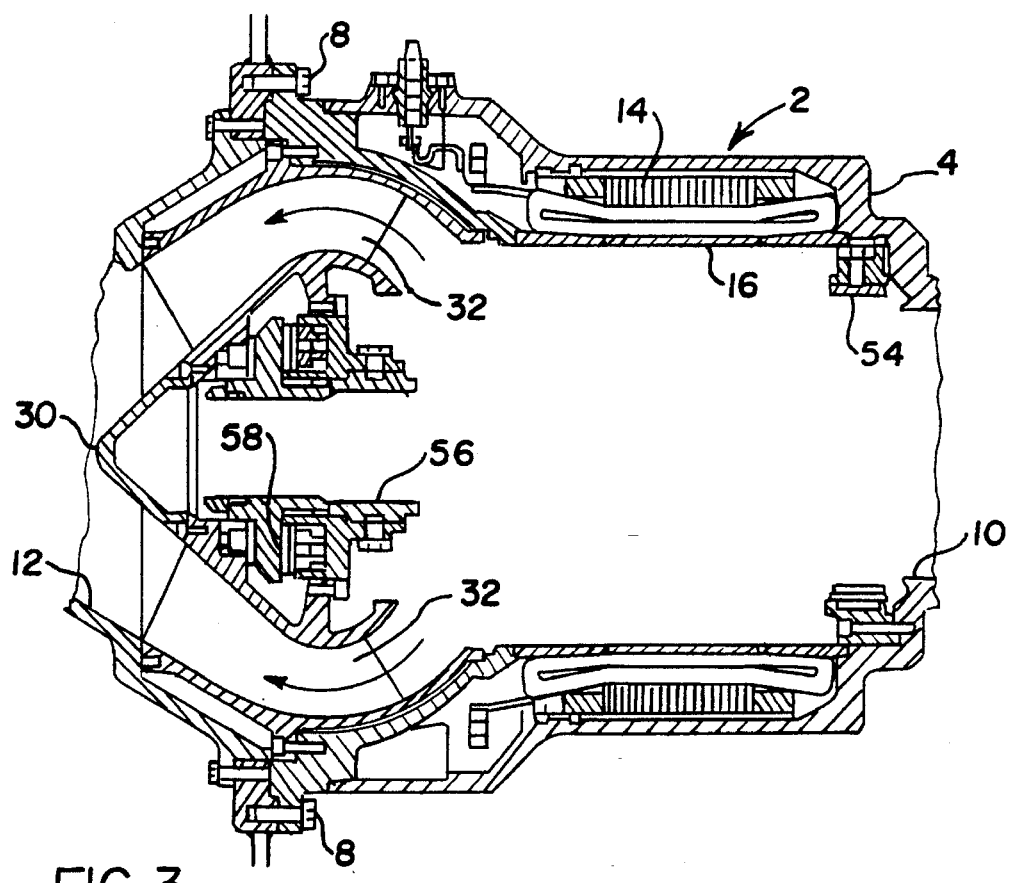
FIG. 3 is a longitudinal sectional view of the housing and hub of the water jet propulsor of FIG. 2.
Figure 4:
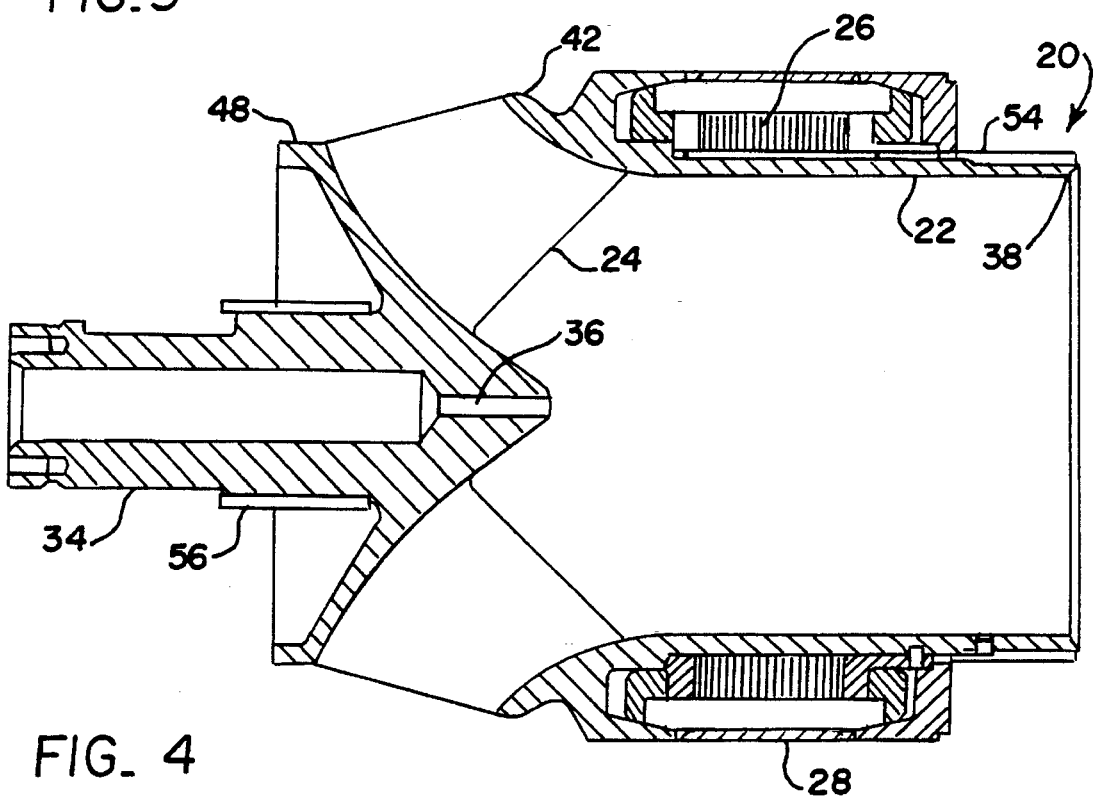
FIG. 4 is a longitudinal sectional view of the impeller assembly of the water jet propulsor of FIG. 2.

Referring to FIGS. 2 through 4, there is shown a preferred embodiment of the water jet propulsor 2 of this invention. Water jet propulsor 2 includes a generally hollow housing 4 secured to the hull 6 of a marine vessel. The marine vessel may be a boat or ship of any suitable size and configuration. Housing 4 is preferably secured to hull 6, at or near the stem of the vessel, using bolts 8. Alternatively, any suitable attachment means, such as welding, may be used. Housing 4 has an inlet end 10 and an outlet end 12. An annular stator 14 is mounted inside housing 4. As may best be seen in FIG. 3, annular stator 14 is hermetically sealed inside housing 4 by stator can 16. Energizing means 18 provide electrical power to stator 16 (FIG. 2). Energizing means 18 preferably include a generator, or other source of electrical power, electrically connected to stator 14. The generator may be positioned in a location in the vessel that is remote from water jet propulsor 2 since only electrical connections to the water jet propulsor, rather than mechanical connections, are required.

Referring more particularly to FIG. 4, water jet propulsor 2 further comprises an impeller assembly 20. Impeller assembly 20 includes a tubular suction shroud 22 extending through and rotatable relative to annular stator 14 (FIG. 2). An impeller 24 is secured to suction shroud 22. The vanes of impeller 24 may be secured to suction shroud 22 by welding or any other suitable manner known to those skilled in the art. The number of blades on impeller 24 and the blade configuration will depend on the desired performance of the water jet propulsor and may be determined in a manner known to those skilled in the art. In a preferred embodiment, impeller 24 is a single stage, mixed flow type impeller. It will be apparent, however, that an impeller having one or more centrifugal, axial or mixed flow type stages may be utilized. A rotor 26 is mounted around tubular suction shroud 22 and inside stator 14. Rotor 26 and stator 14 preferably cooperate to form an induction motor. Rotor 26 is preferably a squirrel cage rotor so that no electrical connections to the rotor are required. It will be appreciated, however, that the motor could be a synchronous motor. Rotor 26 is preferably shrink fitted onto suction shroud 22. Rotor 26 is preferably hermetically sealed by rotor can 28. Energizing stator 14 causes rotor 26 to rotate, thereby rotating suction shroud 22 and impeller 24 to create a pressurized flow of water through the housing 4 from inlet end 10 to outlet end 12. The pumping action of the rotation of impeller 24 adds head and velocity to the water, which causes the water pressure to be higher on the outlet side of the impeller than on the inlet side thereof.

Referring now to FIGS. 2 and 3, in a preferred embodiment, hub 30 is centrally positioned and secured to housing 24 adjacent to outlet end 12. Hub 30 is preferably secured to housing 4 by seven flow straightening vanes 32. However, it will be appreciated that any suitable number of straightening vanes 32 may be used. The desired number of straightening vanes provided may be determined in a manner known to those skilled in the art. Alternatively, hub 30 may be secured to housing 4 by a plurality of struts which have little affect on the water flow. A combination of struts and vanes may also be used. Water flows around hub 30 from inlet end 10 to outlet end 12. The straightening vanes 32 reduce the magnitude of the circular component of motion of the flowing water which is produced by the action of rotating impeller 24.

Impeller assembly 20 preferably includes a generally hollow shaft 34. Shaft 34 has an opening 36 into the central hollow portion thereof. Opening 36 is on the inlet side of impeller 24. Shaft 34 is received into hub 30, thereby rotatably supporting impeller assembly 20.

Referring to FIGS. 2, 3 and 4, tubular suction shroud 22 has a forward end 38 that forms a forward gap 40 relative to housing 4 on the inlet side of impeller 24. Forward gap 40 is adjacent to the inlet end 10 of housing 4 on the inlet side of impeller 24. Tubular suction shroud 22 also has a first aft end 42 forming an aft gap 44 relative to housing 4. Aft gap 44 is on the outlet side of impeller 24. Forward gap 40 and aft gap 44 are preferably in communication with one another, thereby forming a first water circulation channel 46 between rotor 26 and housing 4. During operation, water flowing through housing 4 enters aft gap 44, where the pressure is higher, flows through first water circulation channel 46 and exits through forward gap 40 into the water flowing through housing 4. The water flowing through first water circulation channel 40 cools stator 14 and rotor 26.

Tubular suction shroud 22 preferably also has a second aft end 48 forming a hub gap 50 relative to hub 30 and on the outlet side of impeller 24. Hub gap 50 and opening 36 in shaft 34 are in communication with one another thereby forming a second water circulation channel 52 between hub 30 and tubular suction shroud 22. Water enters hub gap 50, flows through second water circulation channel 52 and exits through opening 36 in shaft 34.

First radial bearings 54 are mounted between housing 4 and suction shroud 22 to rotatably support one end of suction shroud 22. First bearings 54 are preferably one or more hard surface, water cooled pivoted pad or plain journal bearings mounted around the circumference of housing 4 and tubular suction shroud 22. Bearings 54 are preferably in communication with first water circulation channel 46. Water flowing in first water circulation channel 46 also cools and lubricates the bearings. The pads of the bearings of first radial bearings 54 are preferably made of a hard alloy material, such as tungsten carbide, or other suitable material that will not be damaged by sand and other material that may be present in the flowing water.

Second radial bearings 56 are mounted between impeller assembly 20 and hub 30 to rotatably support another end of suction shroud 22. Second radial bearings 56 preferably include one or more hard surface, water-cooled, pivoted pad or plain journal bearings mounted around the circumference of shaft 34 in second water circulation channel 52. Water flowing in second water circulation channel 52 flows over the beatings to cool and lubricate them. The pads of second radial bearings 56 are preferably made of a hard alloy material, such as tungsten carbide, or other suitable material, to minimize the likelihood of damage resulting from sand or other contaminants in the flowing water.

Thrust beatings 58 are preferably mounted between impeller assembly 20 and hub 30. Thrust bearings 58 preferably consist of double acting, water-cooled, self-leveling Kingsburg-type bearings. Thrust bearings 58 are mounted in second water circulation channel 52. Water flowing in second water circulation channel 52 cools and lubricates thrust beatings 58. The pads and thrust runner surfaces of thrust bearings 58 are preferably made of the same materials as the pads of the radial bearings to minimize damage from contaminants in the water flow.

Housing 4 may be provided with a cooling jacket around annular stator 14. Cooling jacket 57 includes water inlet means 59 in communication with the water flowing through housing 4 and located adjacent to outlet end 12. Cooling jacket 57 also includes water outlet means 61 in communication with the water flowing through housing 4 and adjacent to inlet end 10. Water enters the cooling jacket through water inlet means 59, circulates through water cooling jacket 57 and is discharged back into the flow of water in housing 4 through water outlet means 61. The water flowing in cooling jacket 57 provides additional cooling for stator 14 if necessary.

The water jet propulsor of FIG. 2 is preferably mounted in the stern portion of the hull 6 of the vessel. Inlet end 10 of housing 4 is connected to an inlet conduit 60 that is open to the bottom of hull 6. Inlet conduit 60 may be inclined at an angle of 15 to 45 degrees to permit the center line of the water jet propulsor to be elevated from the bottom of the vessel, yet positioned below the static water line of the vessel any desired distance to permit self priming of the unit and to maximize its efficiency. Outlet end 12 of housing 4 is preferably connected to a straight discharge conduit 62. However, it will be appreciated that outlet end 12 may be connected to a volute discharge. Water jet propulsor 2 is shown oriented generally horizontally with respect to the bottom of the vessel. It will be appreciated, however, that it may be mounted at any suitable orientation that permits self-priming and yields the desired performance.

The water jet propulsor of FIG. 2 may be removed from the vessel for maintenance and repair without having to dry dock the vessel. Removal of bolts 8 permit disassembly of the unit for easy removal. In a preferred embodiment, the unit may be disassembled into more easily handled modular portions to facilitate installation, maintenance and removal. A valve 64 may be provided in intake conduit 60 to close the conduit when the unit is removed. A valve or other closure means may also be provided on discharge conduit 62.

In operation, energization of stator 14 causes rotor 26 to rotate. Rotation of rotor 26 also rotates impeller assembly 20, which creates a pumping action. Water, sea water or fresh water, is pumped from the water in which the vessel is floating through inlet conduit 60. The rotating impeller 24 imparts velocity to the water and adds head to the water flow, thereby pressurizing the water. The higher pressure water is discharged out discharge conduit 62 to create a thrust to propel the vessel forward. Flow deflection means 66 may be provided to discharge conduit 62 to selectively deflect the discharged flow of water to steer the vessel. Flow deflection means 66 is preferably a hydraulically controlled flow deflection bucket of a type known to those skilled in the art.

An example of the water jet propulsor of FIG. 2 through 4 having a suction shroud diameter of 16 inches, a motor generating 400 horsepower and rotating the impeller at 1200 rpm to produce a flow rate of 23,000 gallons per minute would be expected to provide a thrust of about 3700 pounds at a vessel speed of about 15 knots. Such a water jet propulsor would be suitable for use in medium size vessels of about 25 to 45 feet in length.

Figure 5:
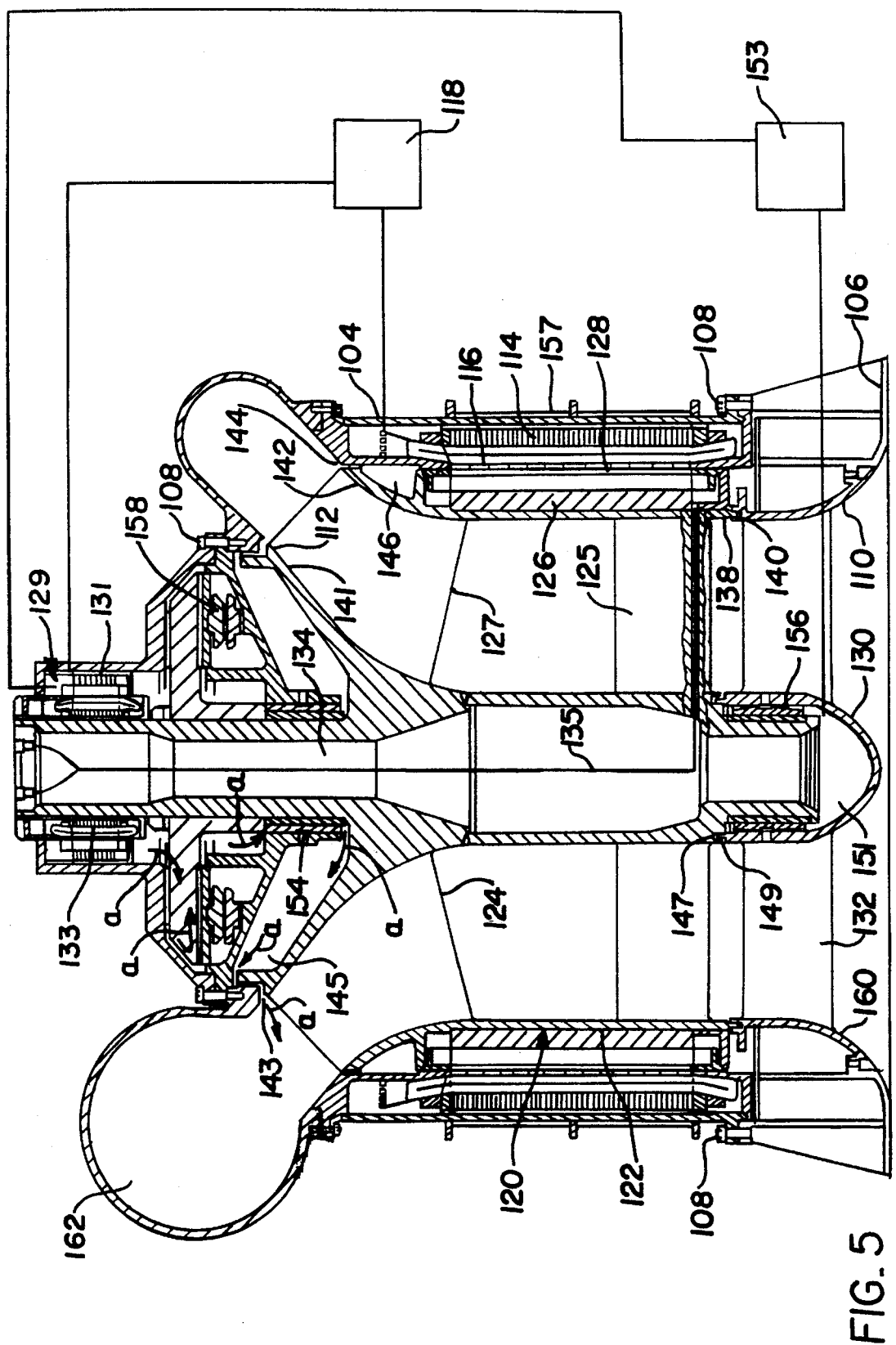
FIG. 5 is a longitudinal sectional view of another embodiment of the water jet propulsor of this invention.
Figure 6:
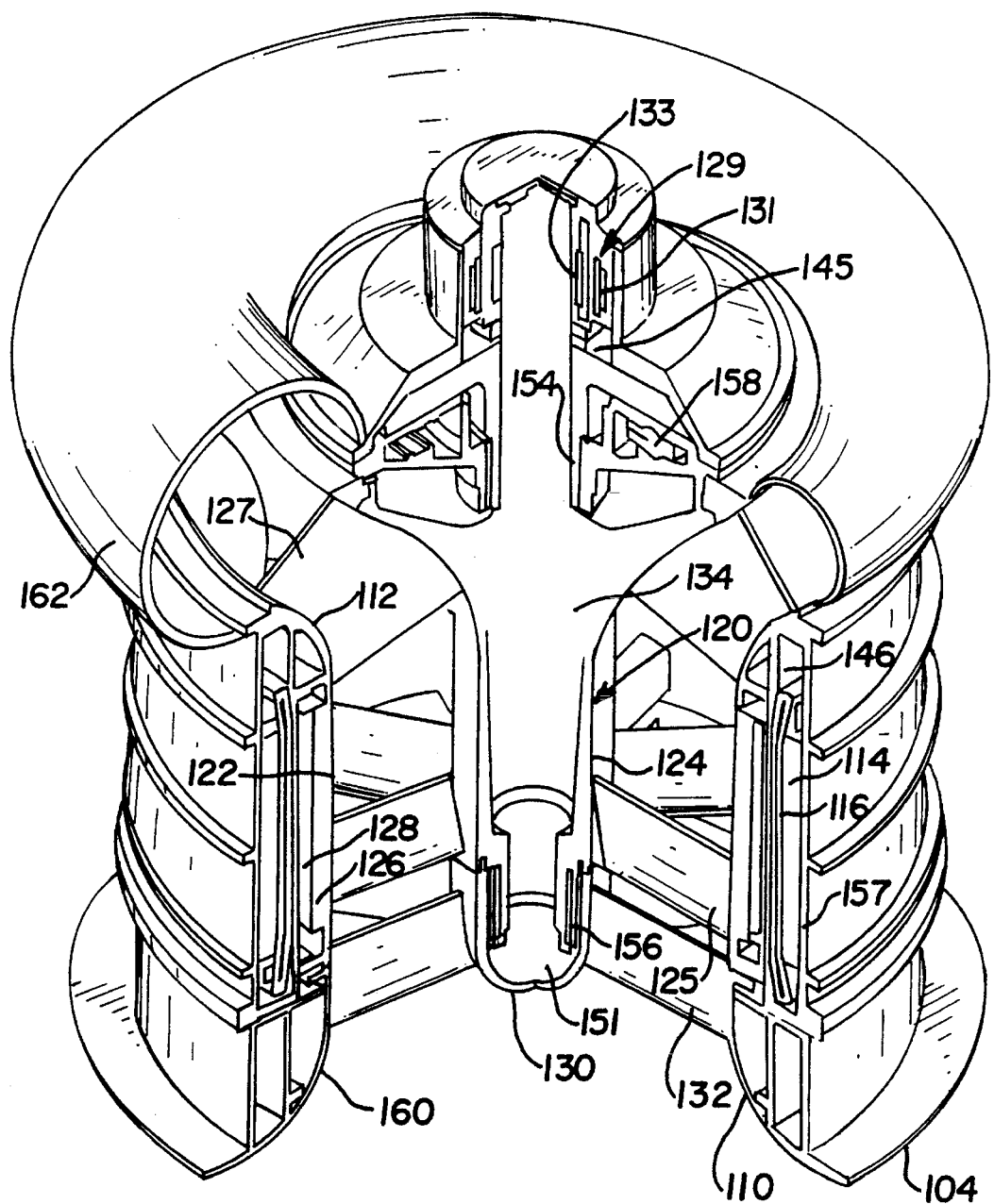
FIG. 6 is a partially cut-away perspective view of the embodiment of this invention shown in FIG. 5.

Referring now to FIGS. 5 and 6, there is shown another embodiment of the water jet propulsor of this invention. This embodiment is particularly well suited for use in larger vessels that require larger motors to provide the thrust necessary to achieve the desired speeds.

The water jet propulsor of this embodiment includes a housing 104 which has attachment means 108 for securing the water jet propulsor to the hull 106 of a vessel. Housing 104 has an inlet end 110 and an outlet end 112. An annular stator 114 is mounted inside housing 104. Annular stator 114 is hermetically sealed inside housing 104 by stator can 116. Energizing means 118 provide electrical power to stator 114.

An impeller assembly 120 includes a tubular suction shroud 122 extending through and rotatable relative to annular stator 114. An impeller 124 is secured to suction shroud 122. Impeller 124 includes an axial stage 125 and a centrifugal stage 127. A rotor 126 is mounted around tubular suction shroud 122 and inside stator 114. Rotor 126 is preferably shrink fitted onto suction shroud 122 and is hermetically sealed by rotor can 128.

An upper portion of impeller assembly 120 preferably includes an exciter/generator 129. Exciter/generator 129 includes an annular stator 131 that is hermetically sealed inside housing 104, and rotor 133 positioned inside stator 131 and preferably shrink fit around a portion of impeller assembly 120. Rotor 133 is also hermetically sealed. Rotor energizing means 135 electrically connect exciter/generator 129 and rotor 126. Rotation of exciter/generator rotor 133 produces an electrical current that is supplied to rotor 126. Energizing rotor 126 and stator 114 causes rotor 126 to rotate thereby rotating suction shroud 122 and impeller 124 which imparts velocity to the water and adds head thereto to pressurize the water flowing through housing 4 from inlet end 110 to outlet end 112. The pumping action caused by the rotation of impeller 124 causes the water pressure to be higher on the outlet side of the impeller than on the inlet side thereof. Once impeller assembly 120 is rotating, exciter/ generator 129 supplies electrical power to rotor 126, thereby creating a synchronous motor. It will be appreciated, however, that the motor formed by rotor 126 and stator 114 may be induction motor, if desired.

In a preferred embodiment, hub 130 is centrally positioned inside and secured to housing 104 adjacent to inlet end 110. Hub 130 is secured to housing 104 by vanes 132. The number and configuration of vanes 132 depends upon desired performance of the water jet propulsor and may be determined in a manner known to those skilled in the art.

Vanes 132 may be pre-swirl vanes or may be straight struts that have little or no affect on the water flow. Alternatively, a combination of vanes and struts may be used. Water flows around hub 130 before reaching impeller 124.

Tubular suction shroud 122 has a first forward end 138 that forms a forward gap 140 relative to the housing 104. Forward gap 140 is on the inlet end side of impeller 124. Tubular suction shroud 122 has a first aft end 142 forming a first aft gap 144 relative to housing 104. First aft gap 144 is adjacent to the outlet end 112 of housing 104. Forward gap 140 and first aft gap 144 are preferably in communication with one another, thereby forming a first water circulation channel 146 between rotor 126 and housing 104. During operation, water flowing through the housing 104 enters aft gap 144, where pressure is higher, flows through first water circulation channel 146 and exits through forward gap 140 into the water flowing through the housing 104. The water flowing through the first water circulation channel 146 cools stator 114 and rotor 126.

Tubular suction shroud 122 includes a central shaft 134. Central shaft 134 is received into hub 130 and housing 104 to rotatably support impeller assembly 120. In a preferred embodiment, excitor/generator 129 is mounted on an upper end of shaft 134. Electrical leads 135 which electrically connect excitor/generator 129 and rotor 126, extend through the opening in shaft 134 and through an opening in one of the vanes 125 of impeller 124.

First radial bearings 154 are mounted on housing 104 and suction shroud 122 to rotatably support one end of suction shroud 122. First bearings 154 are preferably mounted on the upper portion of central shaft 134 of suction shroud 122. First bearings 154 preferably include one or more hard surface, water-cooled pivoted pad or plain journal bearings mounted around the circumference of central shaft 134 of tubular suction shroud 122. The pads of bearings 154 are preferably made of a hard alloy, such as tungsten carbide or other suitable material. Because of the large size of this embodiment, providing radial bearings around the circumference of the suction shroud 122 itself would be impractical. Accordingly, the radial bearings are mounted around shaft 134.

Second radial bearings 156 are mounted on impeller assembly 122 and hub 130 to rotatably support another end of suction shroud 122. Second bearings 156 preferably includes one or more hard surface, water cooled, pivoted pad or regular journal bearings mounted around the circumference of the lower portion shaft 134. The pads of bearings 156 are preferably made of the same type of material as bearings 154.

Thrust bearings 158 are preferably mounted on impeller assembly 120 and housing 104. Thrust bearings 158 preferably include one or more water-cooled, double-acting, self-leveling, Kingsburg type bearings. The thrust runner and bearing pads are preferably made of a hard material, such as tungsten carbide or other suitable material.

Tubular suction shroud 122 has a second aft end 141 that forms a second aft gap 143 relative to housing 104. Second aft gap 143 is in communication with second water circulation channel 145 and is defined between shaft 134 and housing 104. Second water circulation channel 145 includes the gap between rotor 133 and stator 131 of excitor/generator 129, and thrust bearings 158 and first radial bearings 154 and mounted in second water circulation channel 145. A second forward end 147 of shaft 134 suction shroud 122 forms a hub gap 149 relative to hub 130. Hub gap 149 is in communication with hub water circulation channel 151 that is defined between hub 130 and shaft 134.

A cooling water pump means 153 is in communication with second water circulation channel 145 and hub water circulation channel 151. Pump means 153 filters water and pumps it into second water circulation channel 145. The water in second water circulation channel 145 cools excitor 129, cools and lubricates thrust bearing means 158 and first radial bearing means 154 and exits through second aft gap 143 into the water flow through the propulsor. The flow of water through second water circulation channel 145 is shown generally by arrows a. Pump means 153 also pumps water into hub water circulation channel 151, where it passes over and cools and lubricates second radial bearing means 156 and exits through hub gap 149.

Housing 104 may be provided with a cooling jacket 157 around annular stator 114. Cooling jacket 157 includes water inlet means (not shown) in communication with the water flowing through housing 104 and located adjacent to outlet end 112. Cooling jacket 157 also includes water outlet means (not shown) in communication with the water flowing through housing 104 and adjacent to inlet end 110. Water enters the cooling through water inlet means, circulates through water cooling jacket 157 and is discharged back into the flow of water through housing 104 through water outlet means. The water flowing in cooling jacket 157 provides additional cooling for stator 114 if necessary.

The water jet propulsor of FIGS. 5 through 7 may be mounted in any desired location in the hull 106 of the vessel below the static water line thereof. Inlet end 110 of housing 104 may be connected to an inlet conduit 160 that is open to the bottom of hull 106. Inlet conduit 160 may be oriented at an angle of about 0° to 45° with respect to a line perpendicular to the bottom of the vessel. However, the propulsion unit may be oriented at any desired angle sufficient to maintain self priming and obtain the desired performance. The outlet end 112 of housing 104 is preferably connected to a volute discharge 162 (shown more particularly in FIG. 6). The force of the water being discharged from the propulsion unit creates a thrust that propels the vessel forward. Flow deflector means (not shown) of a type known to those skilled in the art may be provided to deflect the discharge flow of water to steer the vessel.

In a preferred embodiment, housing 104 surrounds a portion of volute discharge 162. The portion of housing 104 wherein second radial beating means 156 and thrust bearing means 158 and excitor/generator 129 are located is preferably in the center portion of the spiral of volute discharge 162.

In operation, this embodiment operates substantially identically to that described with respect to FIGS. 2 through 4. An example of water jet propulsion of FIGS. 5 through 7 has a suction shroud having a diameter of about 130 inches. A motor generating 50,000 horsepower rotating the impeller at 120 rpm to produce a flow rate of about 2,000,000 gallons per minute which would produce a thrust of about 300,000 pounds at 30 knots. Such a water jet propulsor would be suitable for a vessel weighing about 2,000 tons capable of travelling at speeds in excess of 50 knots. Such a water jet propulsor would be suitable for use in large, high speed vessels, such as navy cruisers and other war ships and commercial vessels.

The water jet propulsor of FIG. 5 may be disassembled into component parts for repair, installation and maintenance without the vessel having to be dry docked. Removal of various bolts or other fastening means permit disassembly of the unit.

It will be appreciated that this invention provides a water jet propulsor which does not require the installation of a separate drive system, such as a diesel engine or gasoline or steam turbine, nearby, which also eliminates the need for a drive shaft to be mechanically connected to the impeller and mounted in the intake conduit, and which may be oriented at any desired angle in order to maximize performance.

Whereas particular embodiments of this invention have been described for purposes of illustration, it will be evident to those skilled in the art that numerous variations of the details may be made without departing from the invention as described in the appended claims.

What is claimed is:

1. A water jet propulsor for a marine vessel comprising:

a generally hollow housing having an inlet end and an outlet end;

attachment means on said housing for securing said housing to a hull of a marine vessel;

an annular stator hermetically sealed and mounted inside said housing;

energizing means for supplying electrical power to said stator;

a hub centrally positioned inside and secured to said housing to allow water to flow therepast;

an impeller assembly rotatably mounted in said housing and to said hub, said impeller assembly including a tubular suction shroud extending through and rotatable relative to said annular stator, a shaft extending into and rotatably connected to said hub, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end.

2. The water jet propulsor of claim 1, wherein said outlet end includes flow deflection means for selectively deflecting the discharge water flow to steer the vessel.

3. The water jet propulsor of claim 1, wherein said housing includes a water cooling jacket around said stator, said water jacket being in communication with the water flowing through said housing, whereby water will flow through said housing to cool said stator.

4. The water jet propulsor of claim 1, wherein said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing.

5. The water jet propulsor of claim 4, wherein said hub is positioned downstream of said impeller with respect to the water flow.

6. The water jet propulsor of claim 4, wherein said hub is positioned upstream from said impeller with respect to the water flow.

7. The water jet propulsor of claim 6, wherein said shaft of said impeller assembly is a hollow shaft rotatably mounted in said hub and in said housing to rotatably support said impeller assembly.

8. The water jet propulsor of claim 4, wherein said hub is secured to said housing by at least one vane.

9. The water jet propulsor of claim 4, wherein said inlet end is connected to an inlet conduit for supplying water thereto.

10. The water jet propulsor of claim 9, wherein said outlet end is connected to a straight discharge conduit.

11. A water jet propulsor for a marine vessel comprising:

a generally hollow housing having an inlet end and an outlet end;

attachment means on said housing for securing said housing to a hull of a marine vessel:

an annular stator hermetically sealed and mounted inside said housing:

energizing means for supplying electrical power to said stator:

a hub centrally positioned inside and secured to said housing to allow water to flow therepast:

an impeller assembly rotatably mounted in said housing and to said hub, said impeller assembly including a tubular suction shroud extending through and rotatable relative to said annular stator, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end;

said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing;

said hub is positioned downstream of said impeller with respect to the water flow:

said impeller assembly further includes a generally hollow shaft rotatably mounted within said hub, said shaft having an opening into said hollow portion positioned upstream from said impeller with respect to the water flow; and said tubular suction shroud has a second aft end forming a hub gap relative to said hub positioned downstream from said impeller with respect to the water flow, adjacent said outlet end of said housing, said hub gap and said opening in said shaft are in communication with one another forming a second water circulation channel between said hub and said tubular suction shroud.

12. The water jet propulsor of claim 11, wherein first radial bearing means are mounted between said housing and said suction shroud for rotatably supporting one end of said impeller assembly;

second radial bearing means are mounted between said impeller assembly and said hub for rotatably supporting another end of said impeller assembly; and thrust bearing means are mounted between said impeller assembly and said hub to rotatably support said impeller assembly.

13. A water jet propulsor for a marine vessel comprising:

a generally hollow housing having an inlet end and an outlet end;

attachment means on said housing for securing said housing to a hull of a marine vessel;

an annular stator hermetically sealed and mounted inside said housing;

energizing means for supplying electrical power to said stator:

a hub centrally positioned inside and secured to said housing to allow water to flow therepast:

an impeller assembly rotatably mounted in said housing and to said hub, said impeller assembly including a tubular suction shroud extending through and rotatable relative to said annular stator, an impeller secured to said tubular suction shroud, and an annular, hermetically sealed rotor mounted ground said tubular suction shroud and inside said annular stator, such, that rotation of said impeller assembly produces a pressurized water flow through said housing from said intake end to said outlet end;

said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing, said hub is positioned upstream from said impeller with respect to the water flow;

said impeller assembly includes a hollow shaft rotatably mounted in said hub and said housing to rotatably support said impeller assembly;

an annular excitor/generator stator is mounted in said housing, an annular excitor/generator rotor is mounted around said shaft and positioned inside said excitor/generator stator, said stator being electrically connected to said energy means and said excitor/generator rotor being electrically connected to said annular rotor, such that rotation of said excitor/generator rotor produces electrical current that is supplied to said annular rotor whereby it operates as a synchronous motor.

14. The water jet propulsor of claim 13, wherein
suction shroud has a second aft end forming a second aft gap relative to said housing; and
a second water circulation channel is defined between said housing and said shaft and is in connection with said second aft gap.

15. The water jet propulsor of claim 14, wherein
said shaft has a second forward end forming a gap relative to said hub; and
a hub water circulation channel is defined between said shaft and said hub and is in connection with said hub gap.

16. The water jet propulsor of claim 15, wherein
first radial bearing means are mounted between said housing and said shaft for rotatably supporting one end of said impeller assembly;
second radial bearing means are mounted between said shaft and said hub for rotatably supporting another end of said impeller assembly; and
thrust bearings are mounted between said impeller assembly and said housing to rotatably support said impeller assembly.

17. The water jet propulsor claim 16, wherein
said first radial bearing means include at least one water-cooled, hard surface bearing in communication with said second water circulation channel;
said second radial bearing means include at least one water-cooled, hard surface bearing in communication with said hub water circulation channel; and
said thrust bearing means include at least one water-cooled, Kingsburg-type bearing in communication with said second water circulation channel.

18. The water jet propulsor of claim 17, wherein
said impeller has an axial stage and a centrifugal stage.

19. The water jet propulsor of claim 18, wherein
said outlet end is connected to a volute.

20. A pump powered by an integral canned motor comprising:

a generally hollow housing having an inlet end and an outlet end;

an annular stator hermetically sealed and mounted inside said housing;

energizing means for supplying electrical power to said stator;

a hub centrally positioned inside and secured to said housing to allow water to flow therepast;

an impeller assembly rotatably mounted in said housing and to said hub, said impeller assembly including a tubular suction shroud extending through and rotatable relative to said annular stator, a shaft extending into and rotatably connected to said hub, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end.

21. The pump of claim 20, wherein
said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing.

22. The pump of claim 21, wherein
said hub is positioned downstream of said impeller with respect to the water flow.

23. The pump of claim 21, wherein
said impeller assembly includes a hollow shaft rotatably mounted in said hub and said housing to rotatably support said impeller assembly.

24. The pump of claim 21, wherein
said hub is secured to said housing by at least one vane.

25. The pump of claim 21, wherein
said inlet end is connected to an inlet conduit for supplying water thereto.

26. The pump of claim 21, wherein
said housing includes a water cooling jacket around said stator, said water jacket being in communication with the water flowing through said housing, whereby water will flow through said housing to cool said stator.

said hub is positioned upstream from said impeller with respect to the water flow;

said impeller assembly includes a hollow shaft rotatably mounted in said hub and said housing to rotatably support said impeller assembly:

an annular excitor/generator stator is mounted in said housing, an annular excitor/generator rotor is mounted around said shaft and positioned inside said excitor/ generator stator, said stator being electrically connected to said energy means and said excitor/generator rotor being electrically connected to said annular rotor, such that rotation of said excitor/generator rotor produces electrical current that is supplied to said annular rotor whereby it operates as a synchronous motor.

27. The pump of claim 21, wherein said hub is positioned upstream from said impeller with respect to the water flow.

28. A pump powered by an integral canned motor comprising:

a generally hollow housing having an inlet end and an outlet end;

an annular stator hermetically sealed and mounted inside said housing;

energizing means for supplying electrical power to said stator:

a hub centrally positioned inside and secured to said housing to allow water to flow therepast;

an impeller assembly rotatably mounted in said housing and to said hub, said impeller assembly including a tubular suction shroud extending through and rotatable relative to said annular stator, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end:

said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing;

said hub is positioned downstream of said impeller with respect to the water flow:

said impeller assembly further includes a generally hollow shaft rotatably mounted within said hub, said shaft having an opening into said hollow portion positioned upstream from said impeller with respect to the water flow; and said tubular suction shroud has a second aft end forming a hub gap relative to said hub positioned downstream from said impeller with respect to the water flow, adjacent said outlet end of said housing, said hub gap and said opening in said shaft are in communication with one another forming a second water circulation channel between said hub and said tubular suction shroud.

29. The pump of claim 28, wherein first radial bearing means are mounted between said housing and said suction shroud for rotatably supporting one end of said impeller assembly;

second radial beating means are mounted between said impeller assembly and said hub for rotatably supporting another end of said impeller assembly; and thrust bearing means are mounted between said impeller assembly and said hub to rotatably support said impeller assembly.

\* \* \* \* \*

(12) EX PARTE REEXAMINATION CERTIFICATE (5641st)
United States Patent
Veronesi et al.

(10) Number: US 5,490,768 C1
(45) Certificate Issued: Jan. 2, 2007

(54) WATER JET PROPULSOR POWERED BY AN INTEGRAL CANNED ELECTRIC MOTOR

(75) Inventors: Luciano Veronesi, O'Hara Township, Allegheny County, PA (US); James A. Drake, O'Hara Township, Allegheny County, PA (US)

(73) Assignee: Curtiss-Wright Electro-Mechanical Corporation, Cheswick, PA (US)

Reexamination Request:
No. 90/007,162, Aug. 5, 2004

Reexamination Certificate for:
Patent No.: 5,490,768
Issued: Feb. 13, 1996
Appl. No.: 08/164,892
Filed: Dec. 9, 1993

(51) Int. Cl.
*F04D 13/06* (2006.01)
*F04D 13/08* (2006.01)
*H02K 5/132* (2006.01)
*B63H 1/16* (2006.01)
*B63H 11/08* (2006.01)
*B63H 23/24* (2006.01)
*B63H 23/34* (2006.01)

(52) U.S. Cl. .................. 417/356; 417/366; 417/423.12; 440/38

(58) Field of Classification Search ...................... None
See application file for complete search history.

(56) References Cited

U.S. PATENT DOCUMENTS

| | | | |
|---|---|---|---|
| 1,071,042 A | 8/1913 | Fuller | |
| 1,387,416 A | 8/1921 | Lemieux | |
| 1,996,195 A | 4/1935 | Ferguson | |
| 2,197,432 A | 4/1940 | Kingsbury | |
| 2,537,310 A | * 1/1951 | Lapp | ........................ 417/356 |
| 2,656,809 A | 10/1953 | Frasure | |
| 2,839,005 A | 6/1958 | Means | |
| 2,997,015 A | 8/1961 | Richter | |
| 3,143,972 A | 8/1964 | Smith et al. | |
| 3,276,382 A | 10/1966 | Richter | |
| 3,398,996 A | 8/1968 | Wucherer | |
| 3,482,402 A | 12/1969 | Anthoney | |
| 3,708,251 A | 1/1973 | Pierro | |
| 3,723,028 A | * 3/1973 | Bottoms et al. | ............ 417/356 |
| 4,190,395 A | 2/1980 | Ball | |
| 4,360,751 A | 11/1982 | Arnold, Jr. et al. | |

(Continued)

FOREIGN PATENT DOCUMENTS

| | | |
|---|---|---|
| CA | 643644 | 6/1962 |
| DE | 688114 | 1/1940 |
| EP | 0 452 538 A1 | 10/1991 |
| FR | 2 336 297 | 7/1977 |
| GB | 1 439 806 | 6/1976 |
| JP | 0006892 | * 1/1987 |
| JP | 2352295 | 2/1990 |
| JP | 626891 | 2/1994 |
| NO | 166577 | 5/1991 |

OTHER PUBLICATIONS

Brochure of Jastram–Werke GmbH KG entitled "Jastram Forschung—From the Idea to the Marketable Product" dated Aug. 1988.
Waukesha Bearings Public No. TPF–100 "Tilting Pad Thrust Bearing Selective Guide" (undated).

*Primary Examiner*—Kenneth Bomberg

(57) ABSTRACT

A water jet propulsor powered by an integral canned electric motor includes a hollow housing having a hermetically sealed stator mounted therein. The stator is electrically connected to a source of electrical energy in the vessel. An impeller assembly that includes a tubular suction shroud and impeller is rotatably mounted inside the housing. The impeller assembly includes a hermetically sealed rotor which is mounted around the suction shroud and positioned inside the stator in operative association therewith. Energizing the stator rotates the rotor, which in turn rotates the impeller to pump water from the intake end of the housing to the outlet end of the housing and adds velocity and head to the water to be discharged from the outlet end. The discharged water creates thrust which propels the vessel.

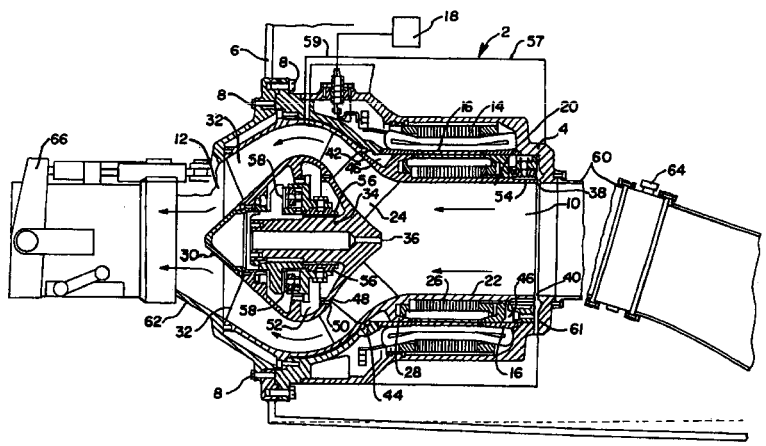

U.S. PATENT DOCUMENTS

| | | |
|---|---|---|
| 4,389,197 A | 6/1983 | Ballantine |
| 4,429,924 A | 2/1984 | Frantz et al. |
| 4,459,087 A | 7/1984 | Barge |
| 4,474,561 A * | 10/1984 | Haglund .................... 440/41 |
| 4,496,862 A | 1/1985 | Weber |
| 4,541,782 A | 9/1985 | Mohn |
| 4,544,285 A | 10/1985 | Shapiro et al. |
| 4,575,315 A | 3/1986 | Galais et al. |
| 4,657,411 A | 4/1987 | Bath |
| 4,678,400 A | 7/1987 | Kuboyama |
| 4,710,111 A | 12/1987 | Kubo |
| 4,831,297 A | 5/1989 | Taylor et al. |
| 4,876,492 A | 10/1989 | Lester et al. |
| 4,886,430 A | 12/1989 | Veronesi et al. |
| 5,108,323 A | 4/1992 | Veronesi et al. |
| 5,165,305 A | 11/1992 | Veronesi |
| 5,165,864 A | 11/1992 | Burger et al. |
| 5,171,514 A | 12/1992 | Veronesi et al. |
| 5,181,868 A | 1/1993 | Gabriel |
| 5,185,545 A | 2/1993 | Veronesi et al. |
| 5,205,653 A | 4/1993 | Veronesi et al. |
| 5,209,650 A | 5/1993 | Lemieux |
| 5,220,231 A | 6/1993 | Veronesi et al. |
| 5,252,875 A | 10/1993 | Veronesi et al. |
| 5,257,952 A | 11/1993 | Veronesi et al. |
| 5,289,068 A | 2/1994 | Veronesi et al. |
| 5,291,087 A | 3/1994 | Pollick et al. |
| 5,336,064 A | 8/1994 | Lamers |
| 5,408,155 A | 4/1995 | Dickinson et al. |
| 5,494,413 A | 2/1996 | Campen et al. |

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–19, 28 and 29 is confirmed.

Claims 3, 4 and 21 are cancelled.

Claims 1, 5, 6, 8, 9, 20 and 22–27 are determined to be patentable as amended.

Claims 2, 7 and 10, dependent on an amended claim, are determined to be patentable.

New claim 30 is added and determined to be patentable.

1. A water jet propulsor for a marine vessel comprising:
   a generally hollow housing having an inlet end and an outlet end;
   attachment means on said housing for securing said housing to a hull of a marine vessel;
   an annular stator hermetically sealed and mounted inside said housing;
   energizing means for supplying electrical power to said stator;
   a hub centrally positioned inside and secured to said housing to allow water to flow therepast;
   an impeller assembly rotatably mounted in said housing and to said hub, said impeller assembly including a tubular suction shroud extending through and rotatable relative to said annular stator, a shaft extending into and rotatably connected to said hub, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end;
   *said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing.*

5. The water jet propulsor of claim [4] *1*, wherein said hub is positioned downstream of said impeller with respect to the water flow.

6. The water jet propulsor of claim [4] *1*, wherein said hub is positioned upstream from said impeller with respect to the water flow.

8. The water jet propulsor of claim [4] *1*, wherein said hub is secured to said housing by at least one vane.

9. The water jet propulsor of claim [4] *1*, wherein said inlet end is connected to an inlet conduit for supplying water thereto.

20. A pump powered by an integral canned motor comprising:
    a generally hollow housing having an inlet end and an outlet end;
    an annular stator hermetically sealed and mounted inside said housing;
    energizing means for supplying electrical power to said stator;
    a hub centrally positioned inside and secured to said housing to allow water to flow therepast;
    an impeller assembly rotatably mounted in said housing and to said hub, said impeller assembly including a tubular suction shroud extending through and rotatable relative to said annular stator, a shaft extending into and rotatably connected to said hub, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end;
    *said tubular suction shroud has a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing.*

22. The pump of claim [21] *20*, wherein said hub is positioned downstream of said impeller with respect to the water flow.

23. The pump of claim [21] *20*, wherein said impeller assembly includes a hollow shaft rotatably mounted in said hub and said housing to rotatably support said impeller assembly.

24. The pump of claim [21] *20*, wherein said hub is secured to said housing by at least one vane.

25. The pump of claim [21] *20*, wherein said inlet end is connected to an inlet conduit for supplying water thereto.

26. The pump of claim [21] *20*, wherein said housing includes a water cooling jacket around said stator, said water jacket being in communication with the water flowing through said housing, whereby water will flow through said housing to cool said stator.
    said hub is positioned upstream from said impeller with respect to the water flow;
    said impeller assembly includes a hollow shaft rotatably mounted in said hub and said housing to rotatably support said impeller assembly:
    an annular exciter/generator stator is mounted in said housing, an annular exciter/generator rotor is mounted around said shaft and positioned inside said exciter/generator stator, said stator being electrically connected to said energy means and said exciter/generator rotor being electrically connected to said annular rotor, such that rotation of said exciter/generator rotor produces electrical current that is supplied to said annular rotor whereby it operates as a synchronous motor.

27. The pump of claim [21] *20*, wherein said hub is positioned upstream from said impeller with respect to the water flow.

*30. A water jet propulsor for a marine vessel comprising:*

*a generally hollow housing having an inlet end and an outlet end;*

*attachment means on said housing for securing said housing to a hull of a marine vessel;*

*an annular stator hermetically sealed and mounted inside said housing;*

*energizing means for supplying electrical power to said stator;*

*a hub centrally positioned inside and secured to said housing to allow water to flow therepast;*

*an impeller assembly rotatably mounted in said housing and to said hub, said impeller assembly including a tubular suction shroud extending through and rotatable relative to said annular stator, a shaft extending into and rotatably connected to said hub, an impeller secured to said tubular suction shroud, and an annular, hermetically sealed rotor mounted around said tubular suction shroud and inside said annular stator, such that rotation of said impeller assembly produces a pressurized water flow through said housing from said intake end to said outlet end;*

*said housing includes a water cooling jacket around said stator, said water jacket being in communication with the water flowing through said housing, whereby water will flow through said housing to cool said stator.*

\* \* \* \* \*